United States Patent [19]
Cascini

[11] Patent Number: 4,516,834
[45] Date of Patent: May 14, 1985

[54] CONTRAST ENHANCED LIQUID CRYSTAL DISPLAY

[75] Inventor: Michael R. Cascini, Cedar Rapids, Iowa

[73] Assignee: Rockwell International Corporation, El Segundo, Calif.

[21] Appl. No.: 483,402

[22] Filed: Apr. 8, 1983

[51] Int. Cl.³ .............................................. G02F 1/13
[52] U.S. Cl. .................................. 350/335; 350/338; 350/339 D
[58] Field of Search ............ 350/335, 345, 338, 339 D

[56] References Cited

U.S. PATENT DOCUMENTS 4,208,869  6/1980  Hanaoka ........................ 350/345 X
4,294,518  10/1981  O'Connor et al. .............. 350/335 X
4,364,039  12/1982  Penz ................................ 350/335 X

OTHER PUBLICATIONS

"Color Liquid Crystal Display", published by Stanley Electric Co., Ltd. in approximately 1981.

Primary Examiner—John K. Corbin
Assistant Examiner—Richard Gallivan
Attorney, Agent, or Firm—Robert C. Mayes; George A. Montanye; H. Fredrick Hamann

[57] ABSTRACT

A contrast enhanced liquid crystal display is disclosed having two substantially identical liquid crystal displays with a transflector disposed in between such that light entering from the viewing surface of the first liquid crystal is attenuated twice by the dark areas of the first crystal, and light entering from the rear of the second crystal is attenuated twice, once by the rear liquid crystal and once by the front liquid crystal. This configuration provides an enhanced contrast for all viewing conditions ranging from bright sunlight to totally dark conditions wherein the contrast ratio is maintained relatively constant at between 9:1 and 11:1 when comparing the light areas of the display to the darkened areas when using single crystals each having a contrast ratio of between 4:1 and 4.5:1 in back lit conditions.

10 Claims, 2 Drawing Figures

CONTRAST ENHANCED LIQUID CRYSTAL DISPLAY

BACKGROUND OF THE INVENTION

This invention relates to electronics in general and in particular to liquid crystal displays.

The advent of liquid crystal display technology has had a profound effect in all areas of electronics, particularly the consumer area and in advanced instrumentation. The cost advantages of a solid state liquid crystal display (LCD) as well as the durability, when compared to mechanical counter-type displays or other technologies such as cathode ray tube displays, is well known.

The twisted nematic liquid crystal display has found particularly wide use in consumer applications due to its extremely low cost. However, dichroic "guest-host" displays are more useful in critical applications such as precision instrumentation and avionics since the viewing angle of a dichroic display is a significant improvement over that of a twisted nematic type display.

A significant problem with the use of dichroic liquid crystal displays has been the maintenance of a constant contrast ratio over widely varying lighting conditions, such as strong sunlight in a first instance compared to extremely dim back lit or front lit conditions at night. This problem has prevented wide-spread acceptance of dichroic liquid crystal displays in avionics applications where visual contrast and "readability" of the display is paramount under virtually all potentially encountered lighting conditions.

SUMMARY AND BRIEF DESCRIPTION OF THE INVENTION

Accordingly, it is an object of the present invention to provide an enhanced contrast ratio dichroic liquid crystal display.

Another object of the present invention is to provide an enhanced contrast ratio liquid crystal display capable of maintaining a relatively constant contrast ratio over widely varying lighting conditions.

Briefly, and in accordance with the present invention, a liquid crystal display constructed in accordance with the present invention comprises two substantially identical liquid crystal displays in a spaced parallel relationship and having a transflector disposed interjacent said displays.

The display in a preferred embodiment utilizes an electroluminescent panel to backlight the assembly and thereby provide internal illumination to the viewing surface under darkened conditions. During times of high ambient lighting conditions, the back lit electroluminescent panel is not normally needed and does not affect the viewing perception of the display.

The enhancement to the contrast is attained by double attenuation of the light whether it is ambient light entering through the viewing surface or light generated by an internal light source.

The transflector as used in the specification is a relatively thin film or sheet of material which is capable of reflecting light received from the viewing surface such that the darkened areas of the outer or viewing crystal provide a double attenuation of light entering from the viewing direction, and the transflector transmits light which is already attenuated once by the second or back crystal and by transmitting it through the first or outer crystal again providing double attenuation.

The novel features believed to be characteristic of this invention are set forth in the appended claims. The invention itself, however, as well as other objects and advantages thereof, may best be understood by reference to the following detailed description of illustrative embodiments when read in conjunction with the accompanying drawings in which:

DETAILED DESCRIPTION OF THE PREFERRED EMBODIMENTS

Figure 1:
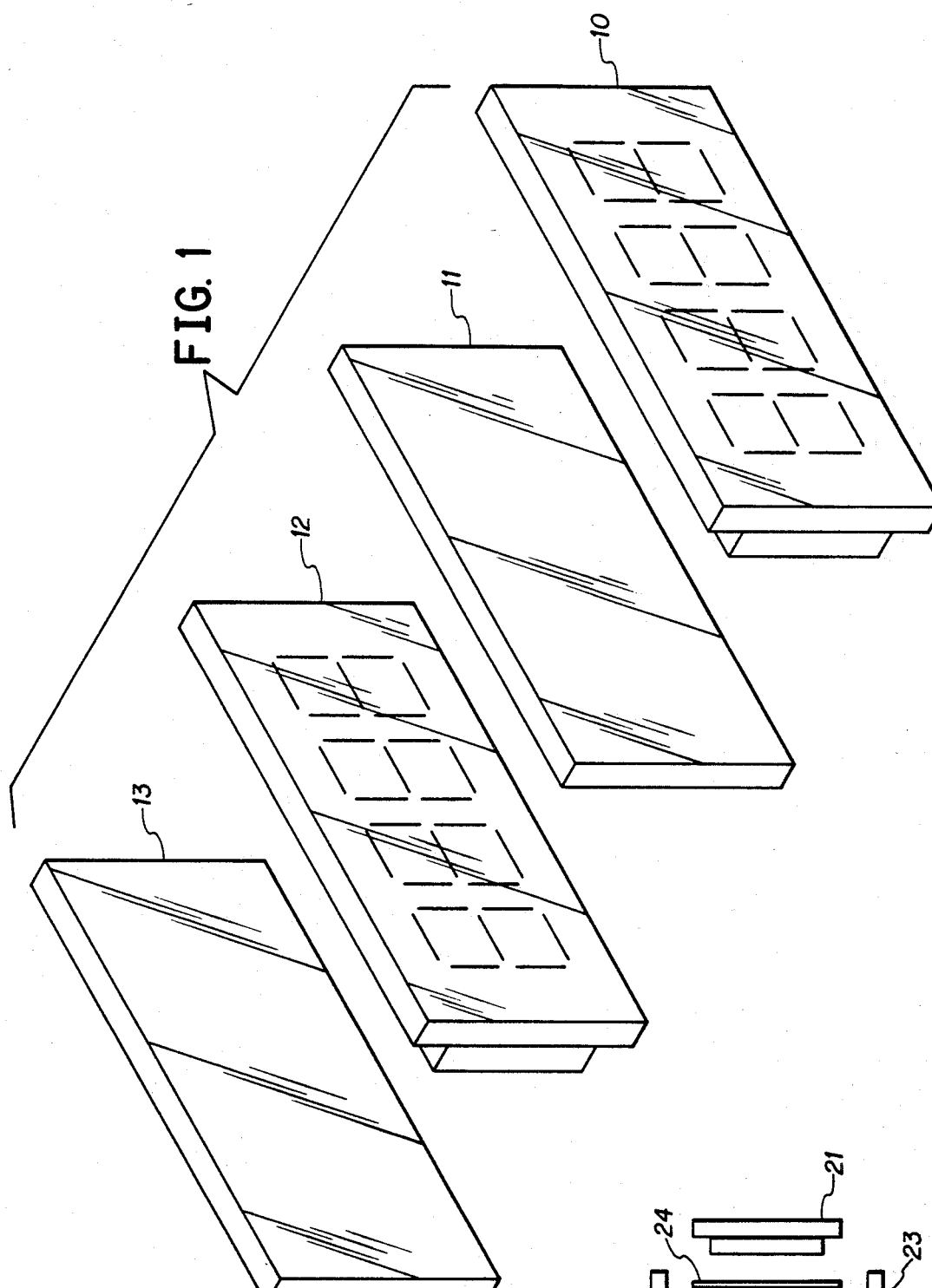
FIG. 1 is an exploded perspective view of a preferred embodiment of the present invention showing the two liquid crystals and the transflector in proper relationships to each other.

Referring now to FIG. 1, an exploded perspective view of a preferred embodiment of the present invention is shown having a first liquid crystal 10 utilized as a primary viewing surface for the display. The liquid crystal displays used in the illustrated embodiment were off-the-shelf dichroic guest-host liquid crystal displays manufactured by Electronic Display Systems, Inc. having a plurality of 7-segment numeric displays formed thereon and both the front crystal 10 and the back liquid crystal display 12 were substantially identical parts.

The transflector 11 was formed of a milky white plastic sheet having a thickness of approximately 0.0025 cm, and was formed of Melanex ®, which is a commonly available industrial plastic sheet material. The proper operation of the present invention was determined to require a balance between a light quantity transmitted from the electroluminescent panel 13 to the front crystal 10 as well as a reflective face on the surface of transflector 11 sufficient to reflect light received from crystal 10 back toward the viewing surface. The characteristic of the transflector considered most important is its ability to act as a diffusing medium for light entering from crystal 12 without blocking a significant percentage of the backlight. The electroluminescent panel 13 was a standard production panel produced by Luminescent Systems, Inc., and was found to be sufficient for the purposes as set forth herein.

Other backlighting techniques are useful and provide a significant contrast enhancing benefit; however, due to space requirements, power requirements, and readily available commercial products suited for the purpose as used herein, electroluminescent lighting panels are preferred.

Figure 2:
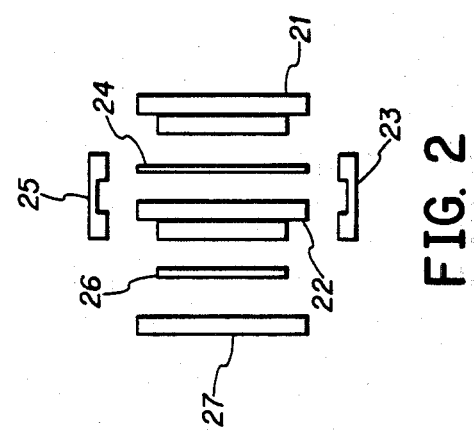
FIG. 2 is a side view of a preferred embodiment of the present invention additionally showing a typical means for electrical interconnection of the two liquid crystal displays to each other and to a printed circuit board for mounting thereon.

Referring now to FIG. 2, a side view of a preferred embodiment of the present invention is shown having two liquid crystals, crystal 21 being the front or viewing crystal and crystal 22 being the second or back crystal relative to the additional components of the display assembly.

Transflector 24 is shown in a proximal parallel relationship disposed between the front crystal 21 and rear crystal 22 such that light entering from the front is attenuated by the dark regions of crystal 21 when entering the crystal, a portion of the entering light is then reflected off the front surface of transflector 24 back through crystal 21. The light is thus attenuated twice through crystal 21 in ambient light conditions providing an enhanced contrast.

Light provided by electroluminescent panel 26 entering from the rear enters liquid crystal 22 and is therein attenuated by the darkened regions of crystal 22, a portion thereof is transmitted through the transflector 24 and into crystal 21. The dark regions of crystal 21 again attenuate the remaining light and provide the viewer a twice-attenuated display since the activated segments of crystal 22 and 21 are maintained in a substantially identical condition for annunciation. The effective viewing perception provides for a doubly-attenuated visual display under both back lit and front lit conditions.

Elastomeric connectors 23 and 25 provide a rapid and reliable connection for each of the segment connections in display 21 with those in display 22 as well as providing an efficient means of electrical interconnection of both displays having the transflector mounted therebetween to printed circuit board 27. The use of clamping means or adhesives to maintain the relative positions of the components of the assembly is known in the art and those means are entirely suitable for the present invention.

It is important to note that the alignment of the front crystal 21 with the segments on crystal 22 must be done with reasonable care, although variations by as much as 10 or 20% of misalignment (when considering the overlap error relative to the width of a segment) are acceptable to maintain a significant portion of the benefits of the present invention. Elastomeric connectors 25 and 23 are in use presently throughout the industry, and in addition to providing efficient and inexpensive electrical connection, the connectors also provide a limited degree of vibration and shock protection for the crystals.

The device as shown and described herein was constructed and tested for contrast by taking luminescence readings from dark or doubly attenuated regions of the front crystal and comparing them with light regions or activated segment regions of the front crystal under a wide variety of external and internal lighting conditions. The contrast ratio was observed between 9:1 and 11:1 over all lighting conditions, including bright sunlight, low ambient or "twilight" conditions with low integral lighting, no ambient light with bright internal lighting, and no ambient light with dim internal lighting, and the variance in contrast under all conditions was less than 15%. Each of the starting crystals when used singly and under back lit conditions was observed to have a contrast ratio between 4:1 and 4.5:1 prior to installation in the combined apparatus. Additional tests were conducted with "high contrast" single crystals typically having a contrast under back lit conditions ranging between 7:1 and 8:1, and contrast under front lit conditions of approximately 25:1. Two of these high contrast crystals were incorporated into an embodiment with the transflector disposed therebetween; the back lit contrast ratios varied from 12:1 to over 20:1 while the front lit contrast ratios varied from 25:1 utilizing a relatively opaque transflector to as low as approximately 12:1 with an extremely clear transflector. Thus it can be seen that the selection of the transflector material is important to the proper operation of the present invention to maintain a constant contrast ratio. Utilizing a 4 mil Mylar ® sheet having a milky-white appearance, the "high contrast" crystals in combination provided a much more constant contrast ratio over all lighting conditions. A wide variety of materials is useful as a transflector and the selection decision of the material will properly balance the clarity or transmissivity of the backlight as a diffusing medium against the reflectivity of the transflector material.

It is significant to note that the contrast ratio compares very favorably with white letters on a black surface (having a contrast ratio typically of 15:1) and is therefore considered entirely suitable for the rigorous conditions required by avionics equipment.

While this invention has been described with reference to various illustrative embodiments, it is not intended that this description be construed in a limiting sense. Various modifications of the illustrative embodiments as well as other embodiments in the invention will be apparent to persons skilled in the art upon reference to this description. It is therefore contemplated that the appended claims will cover any such modifications of embodiments as fall within the true scope of the invention.

What I claim is:

1. A liquid crystal display comprising two distinct liquid crystal displays in a spaced parallel relationship and having a transflector disposed interjacent said displays.

2. A display as in claim 1 further comprising means for illumination disposed adjacent one of said liquid crystal displays.

3. A display as in claim 1 wherein said two liquid crystal displays are substantially identical.

4. A liquid crystal display assembly comprising:
   a. a first liquid crystal display having a segmented configuration;
   b. a transflector disposed in a spaced parallel relationship with said first liquid crystal display; and
   c. a second distinct and separate liquid crystal display disposed adjacent said transflector and on an opposite side thereof relative to said first display, and said second display having segments formed substantially similar to, and aligned with, said segmented configuration of said first display.

5. A display as in claim 4 further comprising means for illumination disposed adjacent one of said liquid crystal displays.

6. A display as in claim 5 wherein said means for illumination comprises an electroluminescent panel.

7. A contrast enhanced liquid crystal display comprising in combination:
   a. a first liquid crystal display having segments for selective annunciation and having a planar viewing surface thereon;
   b. a reflective surface additionally having a light transmission characteristic disposed in a separate and proximal parallel relationship to a surface of said first liquid crystal display opposite said viewing surface, said reflective surface for reflecting light received from said viewing surface back to said viewing surface; and
   c. a second liquid crystal display having a substantially similar segment configuraton to said first liquid crystal display and disposed in a proximal parallel relationship to said reflective surface and in alignment with said first liquid crystal display such that light from said second liquid crystal is transmitted through said reflective surface to said viewing surface of said first liquid crystal display.

8. A contrast enhanced liquid crystal display as in claim 7 wherein said light from said second liquid crystal is provided by an electroluminescent panel disposed in a proximal parallel relationship adjacent said second liquid crystal and on an opposite side thereon relative to said reflective surface.

9. A contrast enhanced liquid crystal display as in claim 8 further comprising elastomeric connectors for electrical intercommunication of said first display with said second display.

10. A contrast enhanced liquid crystal display as in claim 9 further comprising a printed circuit board for electrical interconnection of said first and second liquid crystal displays wherein all of said components have a fixed relative position to said printed circuit board and to each other.

* * * * *